United States Patent
Crawford et al.

(10) Patent No.: US 7,596,096 B2
(45) Date of Patent: Sep. 29, 2009

(54) METHOD AND APPARATUS FOR PROVIDING TRACE ROUTE AND TIMING INFORMATION FOR MEDIA STREAMS

(75) Inventors: James Crawford, Willoughby (AU); Alexander Martin Scholte, Phegans Bay (AU)

(73) Assignee: Avaya Inc, Basking Ridge, NJ (US)

( * ) Notice: Subject to any disclaimer, the term of this patent is extended or adjusted under 35 U.S.C. 154(b) by 918 days.

(21) Appl. No.: 10/835,163

(22) Filed: Apr. 29, 2004

(65) Prior Publication Data

US 2005/0243733 A1    Nov. 3, 2005

(51) Int. Cl.
    H04L 12/26    (2006.01)
(52) U.S. Cl. .................. 370/248; 370/249; 370/250; 370/252; 370/254
(58) Field of Classification Search .............. None
    See application file for complete search history.

(56) References Cited

U.S. PATENT DOCUMENTS

| | | | |
|---|---|---|---|
| 7,310,688 B1 * | 12/2007 | Chin | 709/252 |
| 2003/0097438 A1 * | 5/2003 | Bearden et al. | 709/224 |
| 2004/0109417 A1 * | 6/2004 | Castro et al. | 370/238 |
| 2004/0193709 A1 | 9/2004 | Selvaggi | 709/224 |
| 2005/0251858 A1 * | 11/2005 | DelRegno et al. | 726/22 |
| 2006/0092850 A1 * | 5/2006 | Neidhardt et al. | 370/252 |

FOREIGN PATENT DOCUMENTS

JP    2004-0888537    3/2004

OTHER PUBLICATIONS

RTC3550 RTP: A Transport Protocol for Real-Time Applications, Jul. 2003.

* cited by examiner

*Primary Examiner*—Chi H. Pham
*Assistant Examiner*—Shick Hom
(74) *Attorney, Agent, or Firm*—John C. Moran

(57) ABSTRACT

An apparatus and method that use media packets, such as Real-time Transport Protocol (RTP), packets with a specially define profile to determine the route and round-trip-time information. The route is determined by transmitting by a first network endpoint one or a group of media packets having a number of hops equal to a predefined number and the network address of a second endpoint, incrementing the number of hops upon a non-media packet being received in response to the one or group by a network node because the number of hops was exceeded at that network node. After recording the identification of that network node and incrementing the number of hops, the network endpoint re-transmits the one or group of media packets. The round-trip-time information is determined by timestamp information inserted into the one or group of media packets by the first network endpoint and timestamp information inserted into another one or another group of media packets transmitted from the second network endpoint to the first network endpoint in response to receipt of the one or group of media packets.

30 Claims, 10 Drawing Sheets

METHOD AND APPARATUS FOR PROVIDING TRACE ROUTE AND TIMING INFORMATION FOR MEDIA STREAMS

TECHNICAL FIELD

The present invention relates to communication systems and, in particular, to monitoring network elements utilized for the transmission of media streams.

BACKGROUND OF THE INVENTION

Within the prior art, a well recognized problem in the trouble shooting and monitoring of packet networks that are transmitting multi-media such as voice-over-IP (VoIP) is to trace the route between two network devices and to determine the round-trip-times (RTT) that voice/media packets are experiencing. With respect to determining the route (commonly referred to as traceroute) it is known in the prior art to utilize ICMP or User Diagram Protocol (UDP) packets in traceroute implementations. Since the actual media information is being transported by RTP packets, the prior art use of ICMP packets and UDP packets results in different IP protocol or source and destination ports being utilized between two network devices than the actual ones utilized by the RTP packets. The reason for the use of different UDP source and destination port numbers is so that when the packet eventually gets to the destination it is rejected because the port number is not recognized. In addition, the ICMP packets and UDP packets may not follow the same network path or be given the same Quality of Service (QoS) treatment as the RTP packets for a number of reasons. First, RSVP reservations are utilized to set up the path through a network for the RTP traffic, but the ICMP and UDP packets do not of necessity follow the path setup utilizing the RSVP reservations. Second, it is well known in the prior art that firewalls and gateways may block UDP traffic not considered to be a RTP packet. Third, it is also known within the prior art for firewalls and gateways to discard traffic not of the same size as the expected RTP packets. Fourth, it is also desirable for VoIP devices (particularly high port density devices) not to respond with standard ICMP destination unreachable packets for all UDP traffic and/or ICMP echoes to circumvent DoS attacks. The returned ICMP destination unreachable packets for UDP packets and/or ICMP echoes are necessary to determine the route through the network since these return packets are used to obtain the route information. Because of these four reasons, problems can result in traceroute packets following a different IP route as compared to the route followed by the RTP packets that carry the media. Also because of firewall and gateway filtering, as is well known in the art, a route for the ICMP or UDP packets may not exist at all through the network.

Related problems exist in the determination of the RTT using real time control protocol packets (RTCP). Since RTCP packets are sent using a different UDP source and destination port, it is not unlikely that the RTCP packets will receive a different treatment by the network. An additional requirement on the RTCP packets when used to determine the RTT between network devices, is that the packets must be marked with the same Diffserv code points (DSCP) as the RTP packets in an effect to gain similar treatment from the network as that provided to the RTP packets. However, utilizing the same DSCP for the RTCP packets as that used for the RTP packet does not resolve all problems as follows. First, RTCP packets vary in size and are generally larger than RTP packets which effects their treatment by a network. Second, RTCP packets are sent at a rate as little as 1/500th of the rate that RTP packets are sent which may also effect their treatment by the network. Third, RSVP reservations made to protect RTP streams of packets are unlikely to be made to protect the RTCP stream; and if the RSVP packets were made for the RTCP packets they could fail, and/or be treated differently because of the vastly different traffic profiles. In summary, the results in the RTT calculated by RTCP packets may be different than the actual RTT experienced by RTP packets carrying the actual media.

SUMMARY OF THE INVENTION

The aforementioned problems are solved and a technical advance is achieved in the art by an apparatus and method that uses RTP packets with a specially define profile to determine the traceroute and round-trip-time information.

DETAILED DESCRIPTION

Embodiments of the present invention define new RTP profiles for packets specifically used to obtain traceroute and round-trip-time (RTT) information. Advantageously, the use of the new RTP traceroute packets rather than the traditional approach is that the RTP traceroute packets will have exactly the same characteristics as the RTP packets constituting the media stream. One skilled in the art would readily envision that this has the following advantages. First, RTP traceroute packets will use the same UDP source and destination ports as the RTP packets carrying the media. This eliminates the problems associated with firewalls and gateways and also allows a single RSVP reservation to protect the stream thus insuring the same treatment of the RTP traceroute packets as the RTP media packets by the network. Second, since the RTCP packets are not utilized to determine the RTT information, the RTCP packets can be marked with a signaling priority DSCP rather than the media priority since the RTCP packets now simply signal information regarding the reception of the media RTP packets to the network devices, rather than being utilized to calculate the RTT.

Figure 1:
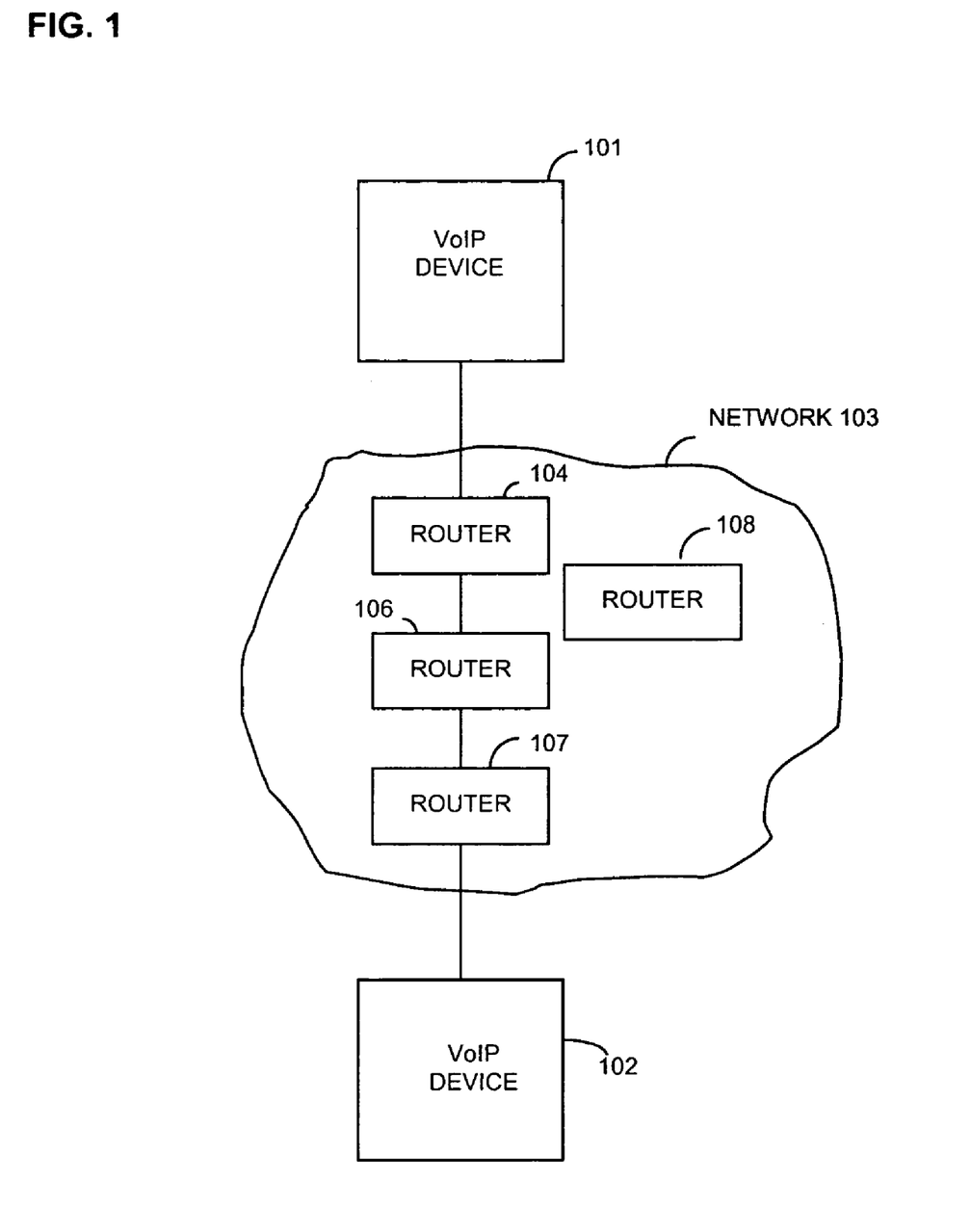
FIG. 1 illustrates an embodiment of the invention.
Figure 2:
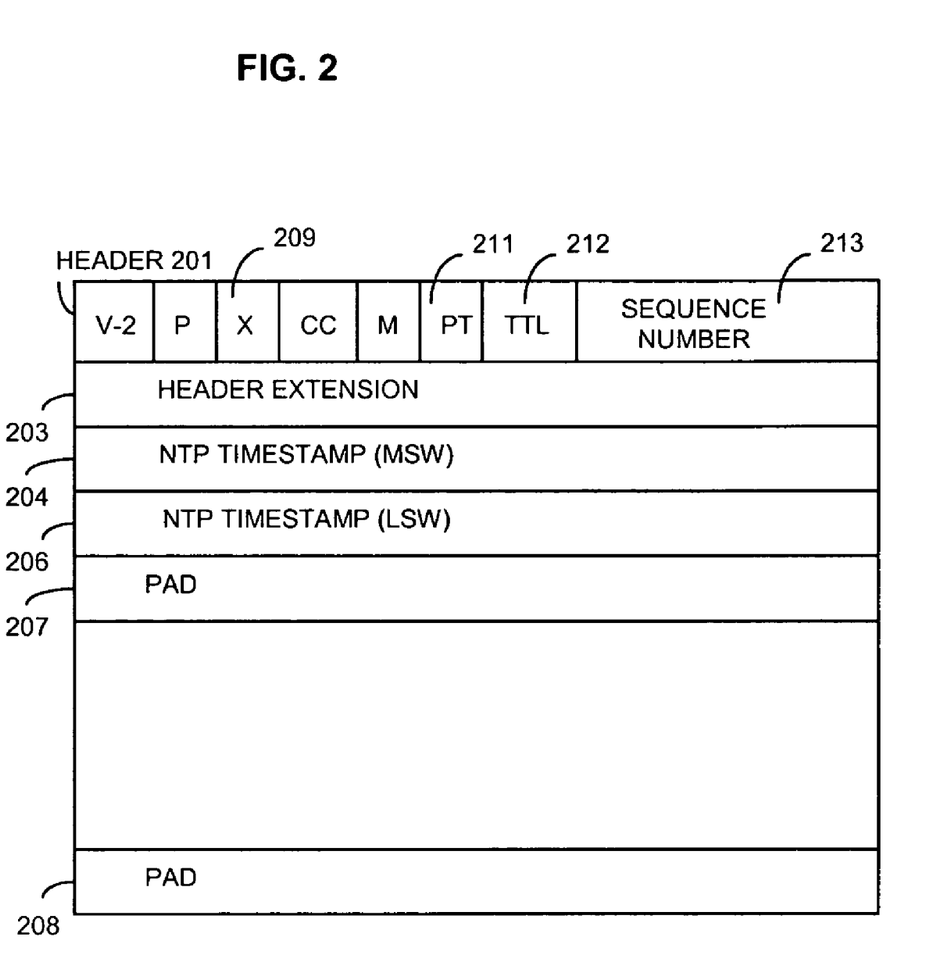
FIGS. 2 and 3 illustrate formats of packets utilized by embodiments of the invention.
Figure 6:
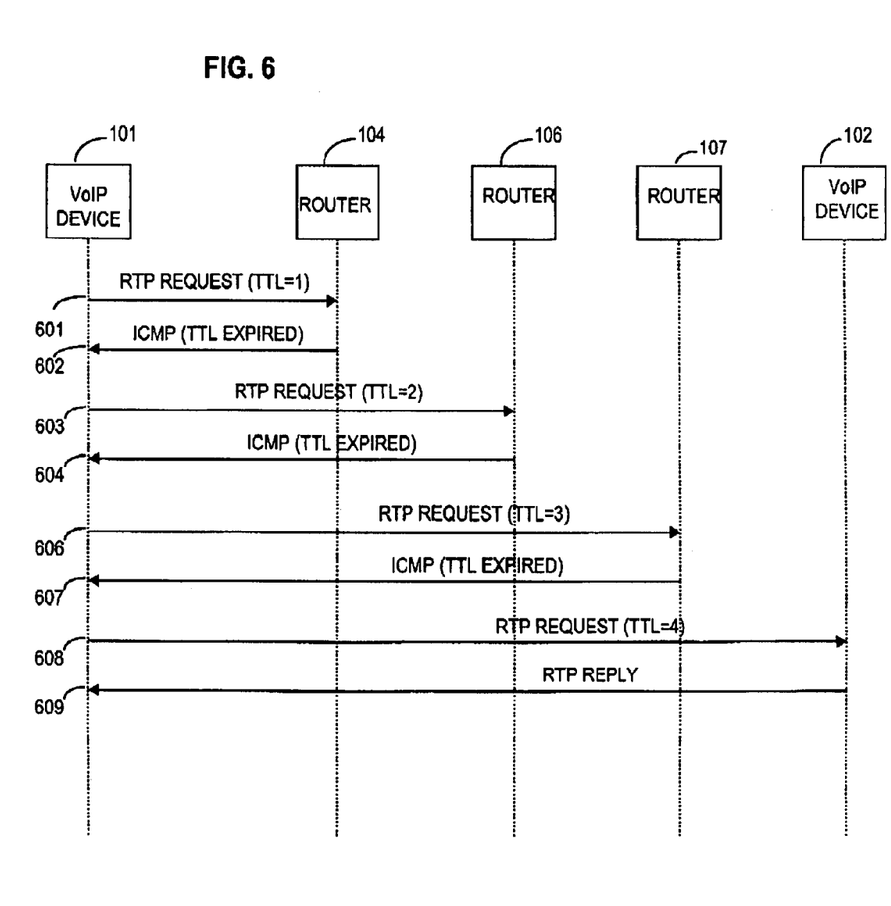
FIG. 6 illustrates the sequence of transmission of packets through the network of FIG. 1.

FIG. 1 illustrates an embodiment of the invention that illustrates a voice-over-IP (VoIP) device transmitting via network 103 to VoIP device 102. One skilled in the art would immediately recognize that devices other than VoIP devices could utilize the various embodiments described henceforth and the scheme applies generally to any device that utilizes the RTP protocol. Network 103 is comprised of routers 104-108. Routers 104-107 form the path that interconnects VoIP device 101 and VoIP device 102. To determine the route and time delay through network 103, device 101 transmits RTP traceroute packets which are packets having the RTP request traceroute format as illustrated in FIG. 2 in embodiment. In this embodiment, extension field 209 is set, and header extension field 203 contains information defining that this is a RTP traceroute packet. To determine that the route from device 101 to device 102 is via router 104-107, device 101 transmits RTP traceroute packets as illustrated in FIG. 6.

The method use to determine the route is similar to the method used by traditional trace route type programs. It relies on setting the Internet Protocol (IP) Time To Live (TTL) field to an increasing value. The address of each router is determined by the ICMP TTL Expired responses. First, device 101 transmits a RTP traceroute packet, packet 601, with the number of hops (TTL=1, field 212) set to one hop. Router 104 is responsive to packet 601 to return an ICMP (TTL expired) packet 602 to device 101 since device 102 could not be reached in only one hop. The ICMP packet also defines that router 104 transmitted this packet. In another embodiment of the invention a predefined number of RTP traceroute packets are sent by device 101 with the TTL=1 but with a different payloads so that the checksums are different for each of these packets. Device 101 uses the difference in checksums to determine the sequence of the returned traceroute packets. By knowing the sequence of returned traceroute packets, device 101 can determine the round trip delay through router 104 of each of the returned packets.

Next, device 101 transmits a second RTP traceroute packet, packet 603, with the TTL field 212 set equal to 2. This packet is communicated by router 104 to router 106 which determines that device 102 can not be reached in only 2 hops and transmits back ICMP packet 604 to device 101 defining that router 106 had transmitted this packet. In another embodiment of the invention a predefined number of RTP traceroute packets are sent by device 101 with the TTL=2 but with a different payloads so that the checksums are different for each of these packets. Device 101 uses the difference in checksums to determine the sequence of the returned traceroute packets. By knowing the sequence of returned traceroute packets, device 101 can determine the round trip delay through router 106 of each of the returned packets.

Next, device 101 transmits packet 606 with the TTL field 212 set equal to 3. This packet reaches router 107 via routers 104 and 106. Router 107 returns ICMP packet (TTL expired) packet 607 that defines to device 101 that the packet reached router 107 but could not reach device 102. In another embodiment of the invention a predefined number of RTP traceroute packets are sent by device 101 with the TTL=3 but with a different payloads so that the checksums are different for each of these packets. Device 101 uses the difference in checksums to determine the sequence of the returned traceroute packets. By knowing the sequence of returned traceroute packets, device 101 can determine the round trip delay through router 107 of each of the returned packets.

Figure 3:
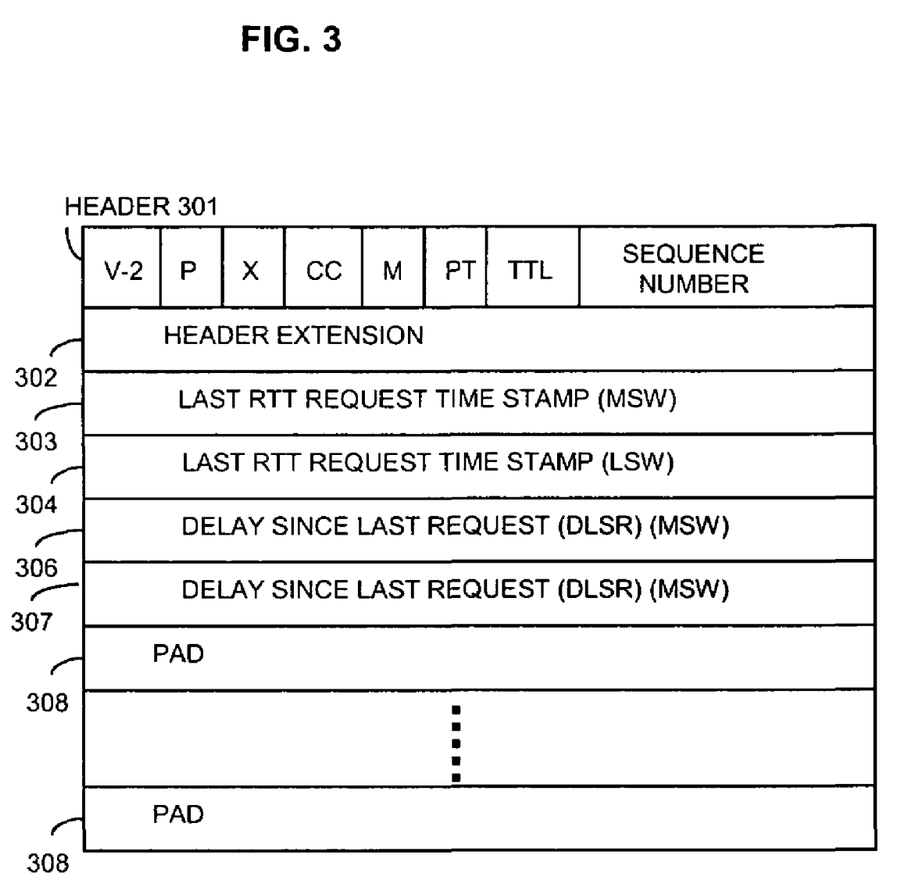

Finally, device 101 transmits RTP request traceroute packet 608 with TTL field 212 set equal to 4, and this packet reaches device 102 which responds with a RTP reply traceroute packet, packet 609, as illustrated in FIG. 3. The RTP reply traceroute packet of FIG. 3 has a different content in header extension field 302 to distinguish it from the packet of FIG. 2. Device 102 inserts the NTP timestamp words 204 and 206 of the received RTP request traceroute packet into words 303 and 304 (last RTT request timestamp), inserts the delay that device 102 took between the receipt of the RTP request traceroute packet and the transmission of the RTP reply traceroute packet 609 into words 306 and 307. Before transmitting the packet 609 back to device 101, pad words 308 through 309 are filled to the desired length, i.e. same length as RTP packets in the media stream.

Device 101 is responsive to receipt of packet 609 to determine the roundtrip transmission time between device 101 and device 102. The route is also determined by information from packets 602, 604, and 607. The timing information of packets 602, 604, and 607 can also be used to determine roundtrip times to each of the individual routers in the path.

Figure 4:
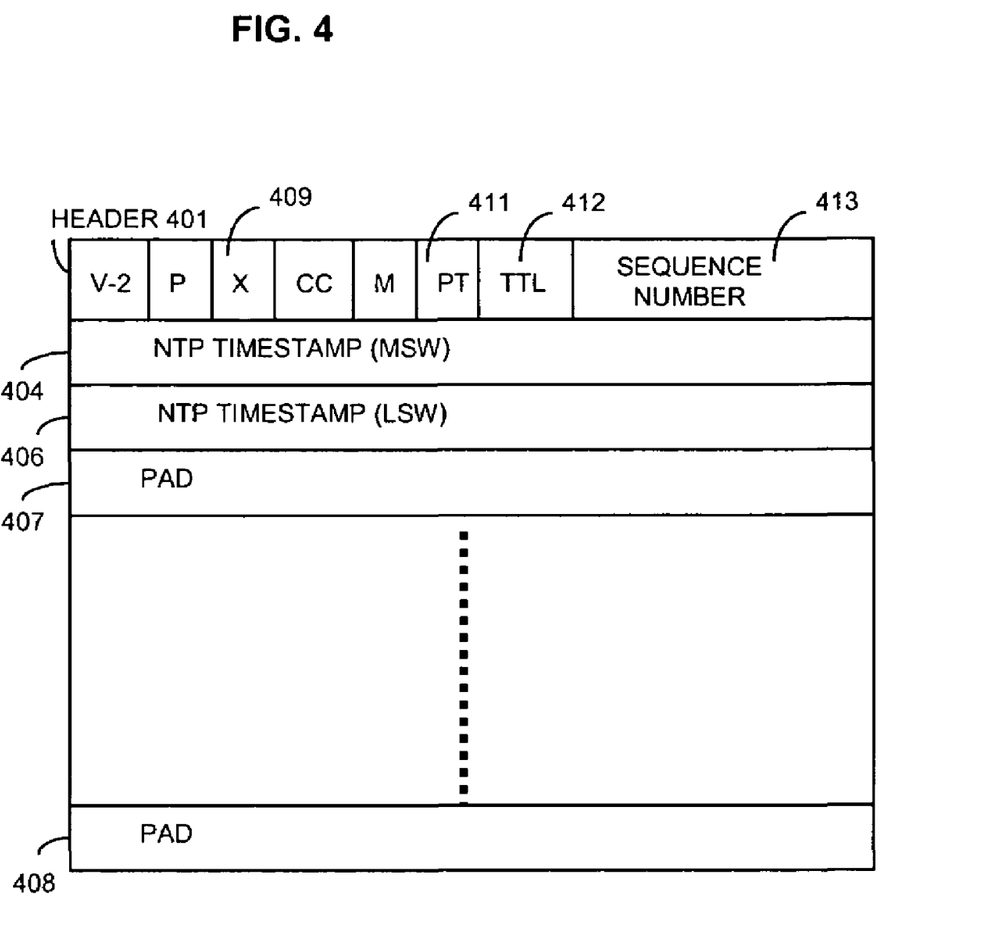
FIGS. 4 and 5 illustrate formats of packets utilized by embodiments of the invention.
Figure 5:
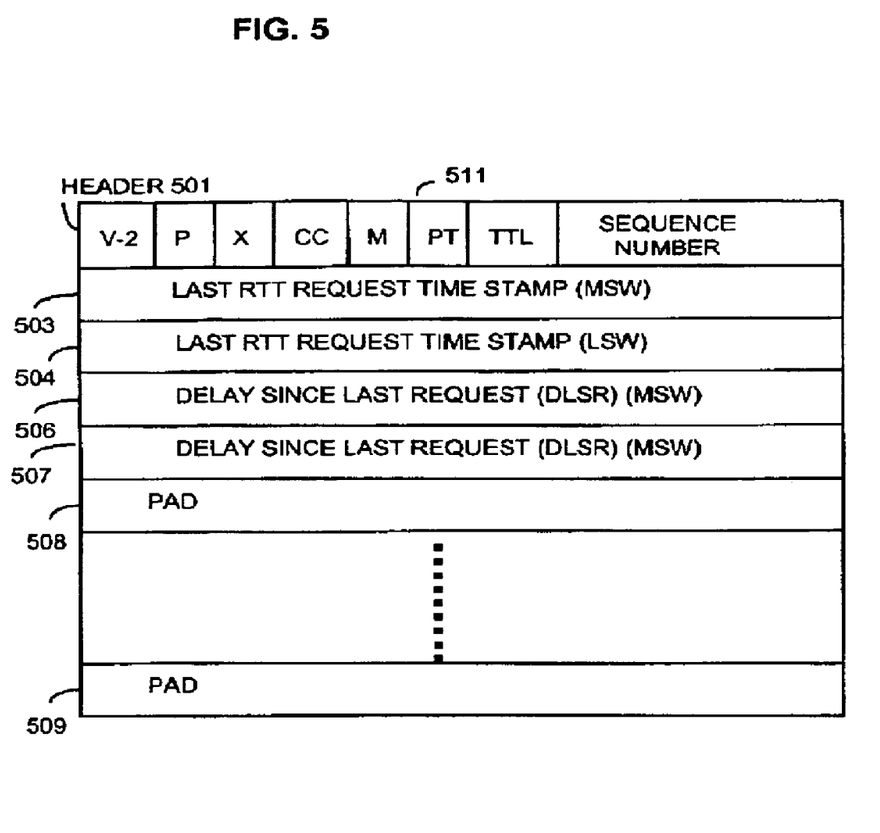

FIGS. 4 and 5 illustrate other embodiments that differ from those of FIGS. 2 and 3 in that PT fields 411 and 511 define the packets as request and reply traceroute packets rather than using the extension header fields of FIGS. 2 and 3. Note, there are no extension header fields in FIGS. 4 and 5. Fields 401 and 404-413 FIG. 4 are similar in functions to Fields 201 and 204-213 FIG. 2. Fields 501 and 503-509 FIG. 5 are similar in functions to Fields 301 and 203-309 FIG. 3.

Figure 7:
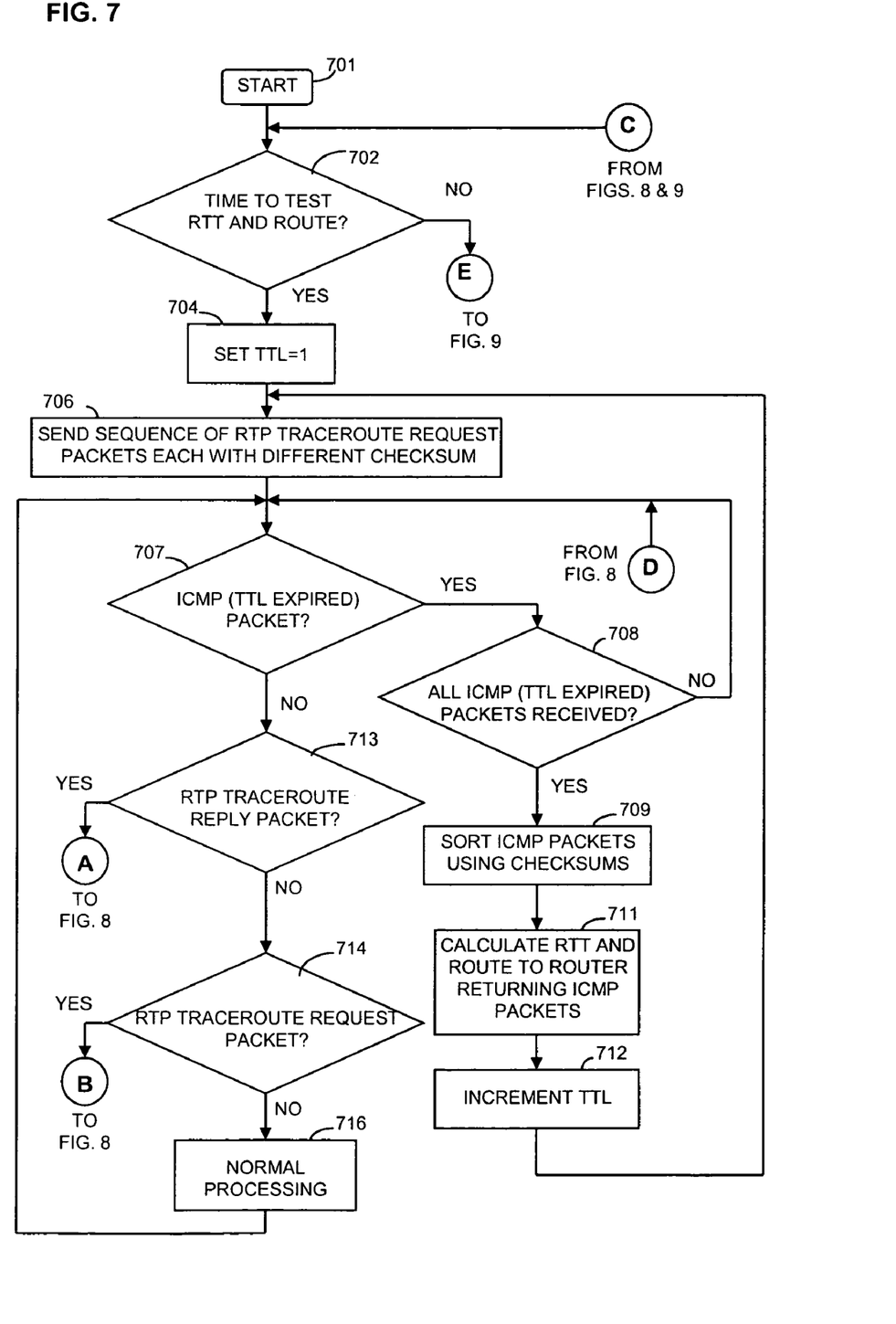
FIGS. 7-9 illustrate, in flowchart form, operations performed by a sending or receiving network endpoint in accordance with embodiments of the invention.
Figure 8:
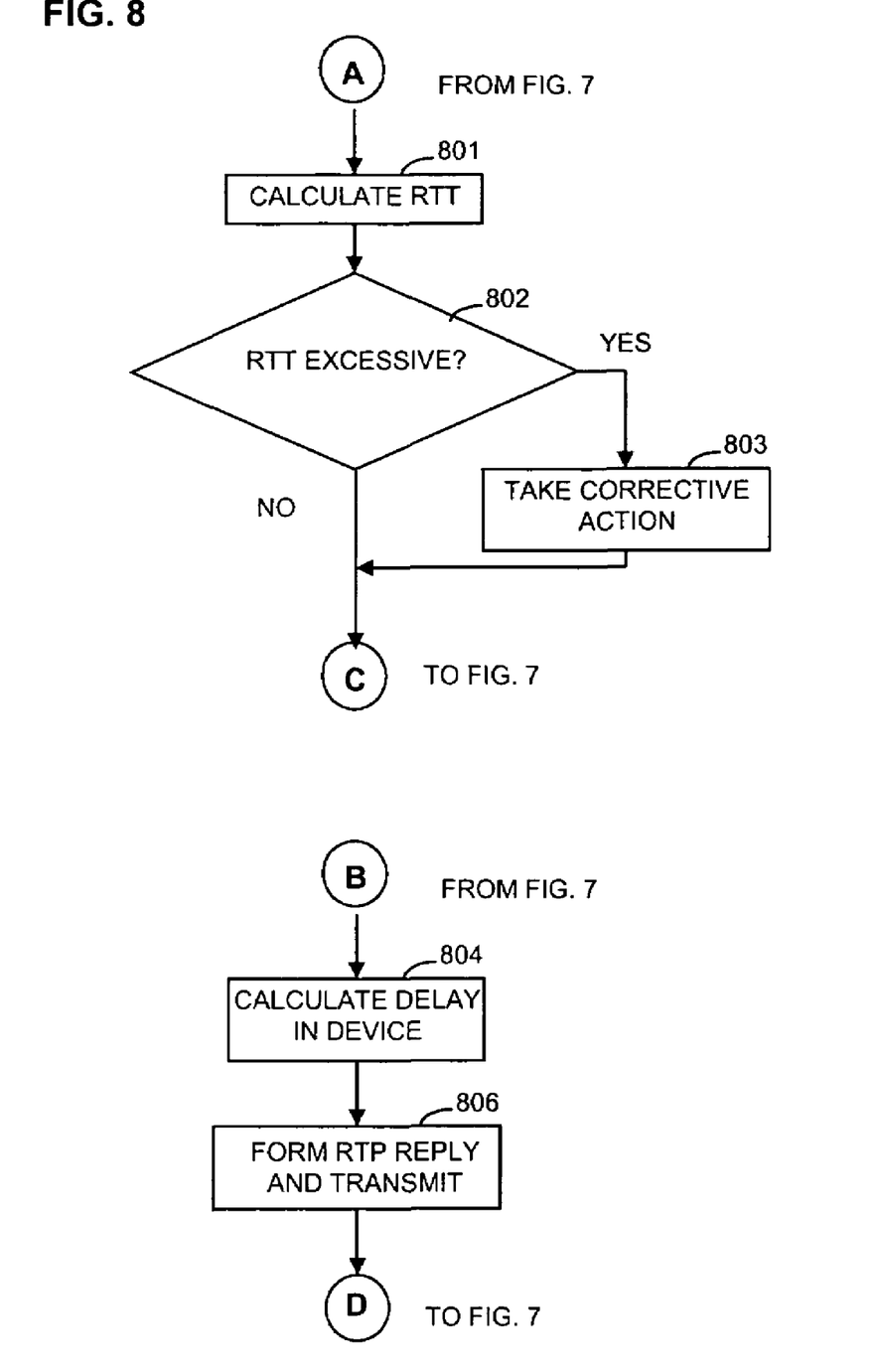
Figure 9:
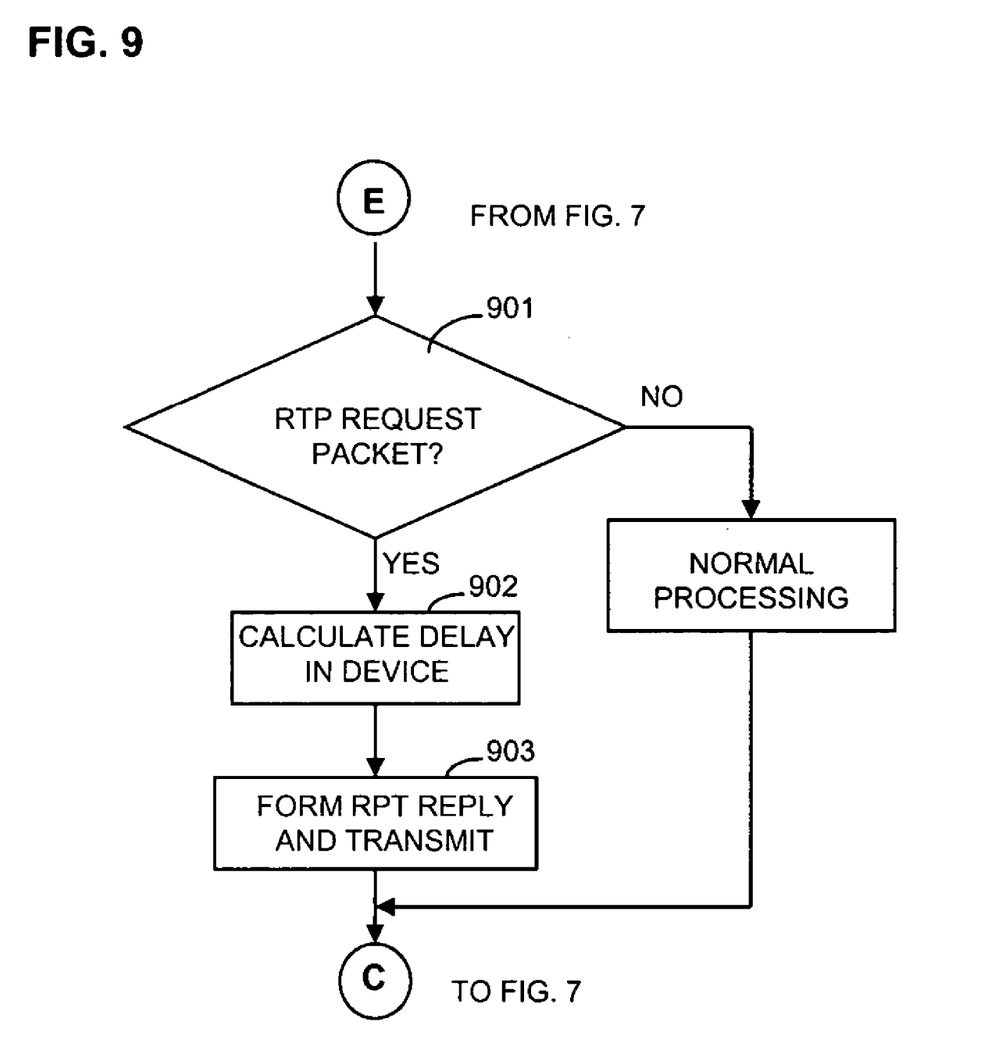

FIGS. 7-9 illustrate, in flowchart form, operations performed by various embodiments of the invention in implementing the operations of endpoint devices such as VoIP device 101 or 102. One skilled in the art would immediately recognize that devices other than VoIP devices could be utilized to perform the operations illustrated in FIGS. 7-9. FIGS. 7-9 illustrate the operations performed by endpoint devices in implementing the embodiments of the invention both from an endpoint device performing the testing operations and endpoint device that is responsive to the testing packets (RTP request packets) and the endpoint responding with the RTP reply packets. After being started from block 701, decision block 702 determines if it is time to test the round-trip-time that voice/media packets are experiencing and also the route through which these packets are being transported. Note, decision block 702 will not be executed if there is not a media call presently set up. If the answer in decision block 702 is no, control is transferred to decision block 901 of FIG. 9.

If the answer in decision block 702 is yes, block 704 sets the number of hops (TTL) equal to one, and sends a sequence of trace route RTP request packets with the TTL set equal to one but with each packet having a different check sum. The different check sums are achieved by padding these packets with different amounts of data. The check sums will subsequently be utilized to determine the sequence of the packets after they are returned from routers within the path as is described with respect to block 711. Note, although it is illustrated that an entire sequence is transmitted before decision block 707 is executed, in another embodiment, the sequence of the transmission of the RTP request packets could be interspersed within the executions of blocks 707-716. Further, in yet another embodiment, only one RTP request packet is transmitted by block 706.

Decision block 707 determines if a packet has been returned from a router or other network element because the number of hops was insufficient to reach the destination device such as device 102 of FIG. 1. Such a packet is an ICMP (TTL expired) packet. A network element such as router 104 returns such a packet if the number of hops designated by the TTL field is insufficient to reach the destination device. If the answer in decision block 707 is yes, control is transferred to decision block 708. The latter decision block determines if all of the packets transmitted by block 706 have been received. Block 708 would also make allowances for the fact that some of these packets may have been lost during transmission and would perform the necessary time out operations. If the answer in decision block 708 is no, control is transferred back to decision block 707. If the answer in decision block 708 is yes, block 709 sorts the returned ICMP packets utilizing the different check signs, block 711 stores the RTT and route information for later use. Finally, block 712 increments the TTL before transferring control back to block 706 so that another sequence of RTP request packets can be transmitted.

Returning to decision block 707, if the answer is no in decision block 707, control is transferred to decision block 713 which determines if a RTP reply packet had been received from the destination device. If the answer is yes, control is transferred to block 801 which calculates the RTT based on the information contained in the reply packet. RTP reply packet has the format as illustrated in FIGS. 3 and 5. In one embodiment of the invention, multiple RTP request packets would have been transmitted and the operation of block 801 would average the calculated RTT information from these resulting RTP reply packets. Decision block 802 determines if the RTT information is excessive. If the answer is yes, block 803 takes corrective action. The corrective action may be to attempt to set up a new route or simply to perform an administrative process that will inform another entity of the problems existing within the network. In one embodiment, the action taken by block 803 uses the information gathered by block 711 of FIG. 7. After execution of block 803 or if the answer in decision block 802 is no, control is transferred back to decision block 702 of FIG. 7.

Returning to decision block 713 of FIG. 7, if the answer is no in decision block 713, decision block 714 determines if a RTP request packet has been received. The function of decision block 714 is to perform the operations if the network endpoint is the destination point of another network endpoint transmitting RTP request packets. If the information is yes in decision block 714, control is transferred to block 804 of FIG. 8 which calculates the delay in the receiving endpoint, and block 806 forms the RTP reply packet and transmits it back to the transmitting endpoint before returning control back to decision block 707 of FIG. 7.

Returning to decision block 702, if the answer in decision block 702 is no, control is transferred to decision block 901 of FIG. 9. Decision block 901 determines if a RTP request packet has been received. If the answer is no, control is transferred to block 904 which performs normal processing before transferring control back to decision block 702 of FIG. 7. If the answer in decision block 701 is yes, block 902 calculates the delay within the receiving block, and block 903 forms and transmits the RTT reply packet as was earlier described with respect to blocks 804 and 806 of FIG. 8.

Figure 10:
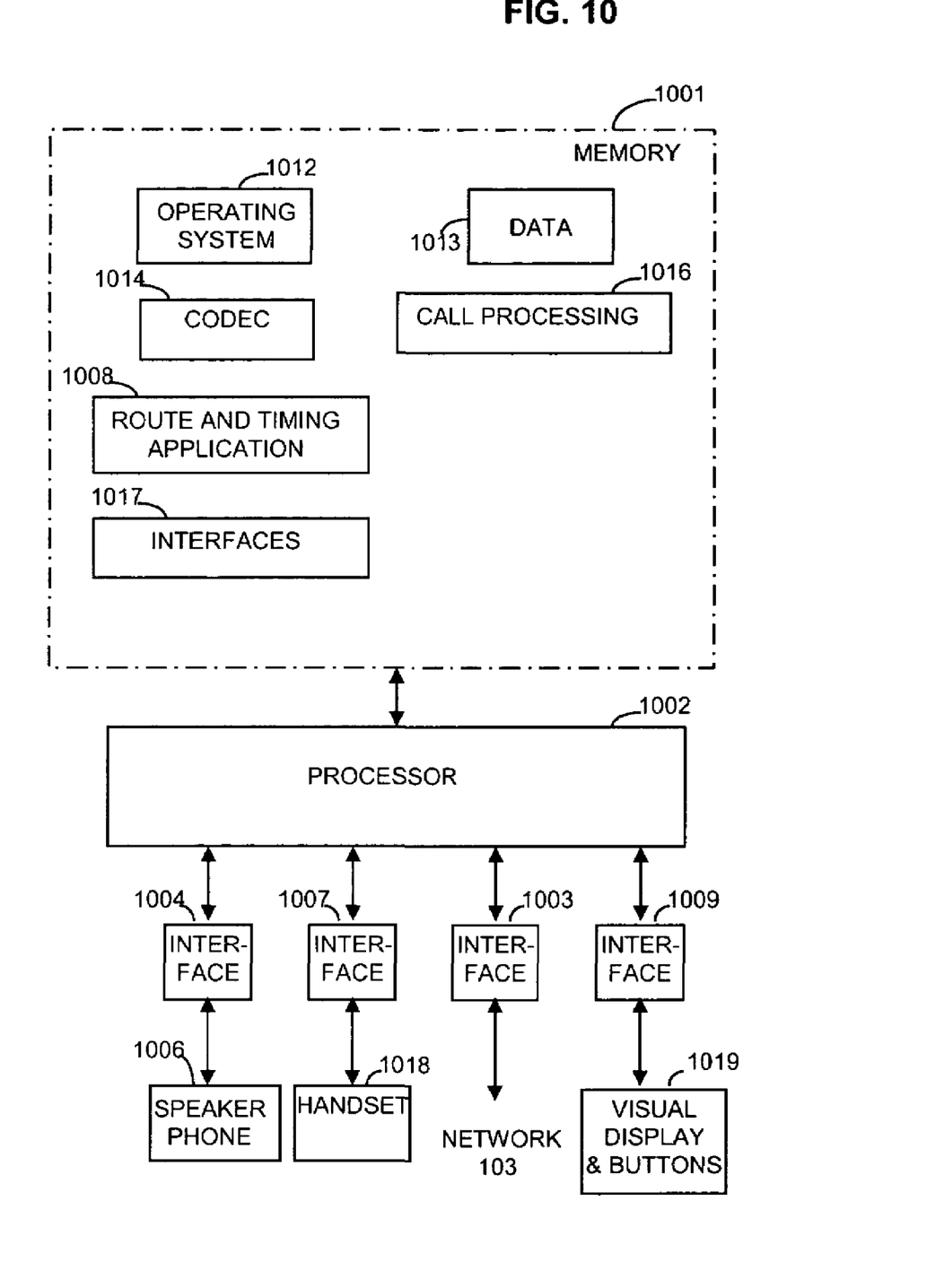
FIG. 10 illustrates, in block diagram form, an embodiment of an IP telephone set.

FIG. 10 illustrates, in block diagram form, one embodiment of a VoIP device such as VoIP device 112. Processor 1002 provides the overall control for the functions of VoIP device 112 by executing programs and storing and retrieving data from memory 1001. Processor 1002 connects to network 103 via interface 1003. Processor 1002 interfaces to handset 1018 via interface 1007 and connects to visual display and buttons 1019 via interface 1009. Visual display and buttons 1019 is all of the indicators, buttons keypad, and display for a VoIP device. Processor 1002 performs the operations of VoIP device 112 by executing the routines illustrated in memory 1001.

Operating system 1012 provides the overall control and the necessary protocol operations. Data is stored in data block 1013. CODEC 1014 encodes and decodes the audio information for communication with handset 1018 or conference speaker and microphone 1006 for communication with network 103. Overall control of the call processing is performed by the VoIP device 112 under the control of call processing routine 1016. The communication and control of the various interfaces illustrated in FIG. 10 is provided by interfaces routine 1017. Route and timing application 1008 controls the operations illustrated in FIGS. 7-9.

When the operations of a VoIP device are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The VoIP device can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the VoIP device is implemented in hardware, the VoIP device can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for obtaining route and timing information for media packets through a network, comprising the steps of:
    inserting a number of hops designation equal to a predefined number into one of the media packets;
    distinguishing the one of the media packets from other media packets by inserting unique information in a header extension field;
    transmitting by a first network endpoint the one of the media packets to a second network endpoint via the network comprising network nodes;
    recording an identification of an $n^{th}$ network node upon a non-media packet being returned by the $n^{th}$ network node in a network path between the first and second network endpoints where n equals the number of hops designation in the one of the media packets causing the $n^{th}$ network node to return the non-media packet;
    incrementing by the first network endpoint the number of hops designation of the one of the media packets and repeating the steps of transmitting, recording, and incrementing upon the non-media packet being returned by the $n^{th}$ network node;
    receiving from the second network endpoint by the first network endpoint another one of the media packets transmitted by the second network endpoint in response to the one of the media packets; and calculating by the first network endpoint an amount of time for a round trip of the one and other one of the media packets between the first and second network endpoints and determining a route from the recorded network node identifications.

2. The method of claim 1 wherein the media packets are Real-time Transport Protocol packets.

3. A method for obtaining route and timing information for media packet through a network wherein media packets are Real-time Transport Protocol packets, comprising the steps of:

inserting a number of hops designation equal to a predefined number into one of the media packets;

distinguishing the one of the media packets from other media packets by inserting unique information into the Payload Type field of the one of the media packets;

transmitting by a first network endpoint the one of the media packets to a second network endpoint via the network comprising network nodes;

recording an identification of an $n^{th}$ network node upon a non-media packet being returned by the $n^{th}$ network node in a network path between the first and second network endpoints where n equals the number of hops designation in the one of the media packets causing the $n^{th}$ network node to return the non-media packet;

incrementing by the first network endpoint the number of hops designation of the one of the media packets and repeating the steps of transmitting, recording, and incrementing upon the non-media packet being returned by the $n^{th}$ network node;

receiving from the second network endpoint by the first network endpoint another one of the media packets by the second network endpoint in response to the one of the media packets; and calculating by the first network endpoint an amount of time for a round trip of the one and other one of the media packets between the first and second network end points and determining a route from the recorded network node identifications.

4. The method of claim 1 wherein the media packets are Real-time Transport Protocol packets and the non-media packets are Internet Control Message Protocol packet returned by the $n^{th}$ network.

5. The method of claim 1 wherein the step of recording further determining an amount of time between transmission of the one of the media packets and a receipt of the non-media packet returned by the $n^{th}$ network node by the first network endpoint.

6. The method of claim 1 wherein the step of transmitting comprises the step of inserting a time stamp into the one of the set of media packets.

7. The method of claim 6 further comprises the step of obtaining from the other one of the media packets a delay time between a receipt of the one of the set of media packets at the second network endpoint and a transmission of the other one of the media packets by the second network endpoint whereby the delay time had been inserted by the second network endpoint.

8. The method of claim 7 wherein the step of calculating comprises the step of using both the time stamp and the delay time to calculate the round trip time.

9. A method for obtaining route and timing information for media packets through a network, comprising the steps of:

inserting a number of hops designation equal to a predefined number into each of a group of the media packets;

transmitting by a first network endpoint the group of the media packets with time stamps to a second network endpoint via the network comprising network nodes;

recording an identification of the an $n^{th}$ network node upon non-media packets being returned by the $n^{th}$ network node in a network path between the first and second network endpoints where n equals the number of hops designation in the group of the media packets causing the $n^{th}$ network node to return the non-media packets;

incrementing by first network endpoint the number of hops designator for the group of the set of media packets and repeating the steps of transmitting, recording, will and incrementing, upon the non-media packets being returned by the $n^{th}$ network node;

receiving from the second network endpoint by the first network endpoint another group of the media packets transmitted by the second network endpoint in response to the group of media packets whereby each of the other group of media packets corresponds to one of the group of media packets; and calculating by the first network endpoint an amount of time for a round trip of each one of the group of the media packets and the corresponding one of the other group of media packets between the first and second network endpoints and determining the route from the recorded network node identifications.

10. The method of claim 9 wherein the media packets are Real-time Transport Protocol packets and the non-media packets are Internet Control Message Protocol packets.

11. The method of claim 9 wherein the step of recording further determining an amount of time between transmission of each of the group of the media packets and a receipt of a corresponding non-media packet returned by the $n^{th}$ network node by the first network endpoint.

12. The method of claim 11 wherein the step of transmitting comprises the step of inserting a different amount of data into each of the group of the media packets there by resulting in each of the group having a unique checksum; and determining the correspondence of a non-media packet to one of the group by use of the checksum.

13. The method of claim 9 further comprises the step of reading from each of ones of the other group of the media packets a delay time between a receipt of the one of the media packets at the second network endpoint and a transmission of each of the other group of the media packets by the second network endpoint whereby the delay time had been inserted by the second network endpoint.

14. The method of claim 13 wherein the step of calculating comprises the step of using both the time stamps and the delay times to calculate the round trip time.

15. The method of claim 14 wherein the step of transmitting comprises the step of inserting a different amount of data into each of the group of the media packets there by resulting in each of the group having a unique checksum; and determining the correspondence of each of the group of media packet to one of the other group of the media packets by use of the checksum.

16. A computer-readable medium for obtaining route and timing information for media packets through a network, comprising computer-executable instructions configured for:

inserting a number of hops designation equal to a predefined number into one of the media packets;

distinguishing the one of the media packets from other media packets by inserting unique information in a header extension field;

transmitting by a first network endpoint the one of the media packets to a second network endpoint via the network comprising network nodes;

recording an identification of an $n^{th}$ network node upon a non-media packet being returned by the $n^{th}$ network node in a network path between the first and second network endpoints where n equals the number of hops designation in the one of the media packets causing the $n^{th}$ network node to return the non-media packet;

incrementing by the first network endpoint the number of hops designation of the one of the media packets and repeating the steps of transmitting, recording, and incrementing upon the non-media packet being returned by the $n^{th}$ network node;

receiving from the second network endpoint by the first network endpoint another one of the media packets transmitted by the second network endpoint in response to the one of the media packets; and calculating by the first network endpoint an amount of time for a round trip of the one and other one of the media packets between the first and second network endpoints and determining a route from the recorded network node identifications.

17. The computer-readable medium of claim 16 wherein the media packets are Real-time Transport Protocol packets.

18. A computer-readable medium for obtaining route and timing information for media packets through a network wherein media packets are Real-time Transport Protocol packets, comprising computer-executable instructions configured for:

inserting a number of hops designation equal to a predefined number into one of the media packets;

distinguishing the one of the media packets from other media packets by inserting unique information into a Payload Type field of the one of the media packets;

transmitting by a first network endpoint the one of the media packets to a second network endpoint via the network comprising network nodes;

recording an identification of an $n^{th}$ network node upon a non-media packet being returned by the $n^{th}$ network node in a network path between the first and second network endpoints where n equals the number of hops designation in the one of the media packets causing the $n^{th}$ network node to return the non-media packet;

incrementing by the first network endpoint the number of hops designation of the one of the media packets and repeating the steps of transmitting, recording, and incrementing upon the non-media packet being returned by the $n^{th}$ network node;

receiving from the second network endpoint by the first network endpoint another one of the media packets by the second network endpoint in response to the one of the media packets; and calculating by the first network endpoint an amount of time for a round trip of the one and other one of the media packets between the first and second network endpoints and determining a route from the recorded network node identifications.

19. The computer-readable medium of claim 16 wherein the media packets are Real-time Transport Protocol packets and the computer-readable medium further comprises transmitting a Internet Control Message Protocol packet by the $n^{th}$ network nodes as the non-media packet.

20. The computer-readable medium of claim 16 wherein the recording further determining an amount of time between transmission of the one of the media packets and a receipt of the non-media packet returned by the $n^{th}$ network node by the first network endpoint.

21. The computer-readable medium of claim 16 wherein the transmitting comprises inserting a time stamp into the one of the set of media packets.

22. The computer-readable medium of claim 21 further comprises obtaining from the other one of the media packets a delay time between a receipt of the one of the media packets at the second network endpoint and a transmission of the re-transmitted one of the set of media packets by the second network endpoint.

23. The computer-readable medium of claim 22 wherein the calculating comprises using both the time stamp and the delay time to calculate the round trip time.

24. A computer-readable medium for obtaining route and timing information for media packets through a network, comprising computer-executable instructions configured for:

inserting a number of hops designation equal to a predefined number into each of a group of the media packets;

transmitting by a first network endpoint the group of the media packets with time stamps to a second network endpoint via the network comprising network nodes;

recording an identification of an $n^{th}$ network node upon non-media packets being returned by the $n^{th}$ network node in a network path between the first and second network endpoints where n equals the number of hops designation in the group of the media packets causing the $n^{th}$ network node to return the non-media packets;

incrementing by first network endpoint the number of hops designation for the group of the set of media packets and repeating the steps of transmitting, recording, will and incrementing, upon the non-media packets being returned by the $n^{th}$ network node;

receiving from the second network endpoint by the first network endpoint another group of the media packets transmitted by the second network endpoint in response to the group of media packets whereby each of the other group of media packets corresponds to one of the group of media packets; and calculating by the first network endpoint an amount of time for a round trip of each one of the group of the media packets and the corresponding one of the other group of media packets between the first and second network endpoints and determining the route from the recorded network node identifications.

25. The computer-readable medium of claim 24 wherein the media packets are Real-time Transport Protocol packets and the computer-readable medium further comprises transmitting Internet Control Message Protocol packets by the $n^{th}$ network nodes as the non-media packets.

26. The computer-readable medium of claim 24 wherein the recording further determining an amount of time between transmission of each of the group of the media packets and a receipt of a corresponding non-media packet returned by the $n^{th}$ network node by the first network endpoint.

27. The computer-readable medium of claim 26 wherein the transmitting comprises inserting a different amount of data into each of the group of the media packets there by resulting in each of the group having a unique checksum; and determining the correspondence of a non-media packet to one of the group by use of the checksum.

28. The computer-readable medium of claim 24 further comprises inserting into each of ones of the other group of the media packets a delay time between a receipt of the one of the media packets at the second network endpoint and a transmission of each of the other group of the media packets by the second network endpoint whereby the delay time had been inserted by the second network endpoint.

29. The computer-readable medium of claim 28 wherein the calculating comprises using both the time stamps and the delay times to calculate the round trip time.

30. The computer-readable medium of claim 29 wherein the transmitting comprises inserting a different amount of data into each of the group of the media packets there by resulting in each of the group having a unique checksum; and determining the correspondence of each of the group of media packet to one of the other group of the media packets by use of the checksum.

* * * * *